(12) United States Patent  (10) Patent No.: US 7,903,231 B2
Haubmann                   (45) Date of Patent:     Mar. 8, 2011

(54) METHOD FOR CONTROLLING AN IMAGING BEAM PATH WHICH IS TAPPED OFF FROM A FILM RECORDING BEAM PATH OF A MOVIE CAMERA

(75) Inventor: Michael Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 779 days.

(21) Appl. No.: 10/594,344

(22) PCT Filed: Mar. 15, 2005

(86) PCT No.: PCT/DE2005/000498
§ 371 (c)(1),
(2), (4) Date: Jul. 20, 2007

(87) PCT Pub. No.: WO2005/096092
PCT Pub. Date: Oct. 13, 2005

(65) Prior Publication Data
US 2007/0264005 A1 Nov. 15, 2007

(30) Foreign Application Priority Data
Mar. 26, 2004 (DE) .......................... 10 2004 016 224

(51) Int. Cl.
*G03B 13/08* (2006.01)
(52) U.S. Cl. .......................................... 352/94; 348/344
(58) Field of Classification Search .................. 352/67, 352/93, 94; 348/333.09, 333.11, 344; 396/385, 396/386
See application file for complete search history.

(56) References Cited

U.S. PATENT DOCUMENTS
3,899,791 A * 8/1975 Kerr .............................. 396/354
4,101,916 A * 7/1978 Gottschalk et al. ........... 396/287
(Continued)

FOREIGN PATENT DOCUMENTS
DE 27 34 792 C2 2/1978
(Continued)

OTHER PUBLICATIONS
International Preliminary Report on Patentability dated Mar. 15, 2005 corresponding to PCT/DE2005/000498.
(Continued)

*Primary Examiner* — William C Dowling
(74) *Attorney, Agent, or Firm* — Christie, Parker & Hale LLP (57) ABSTRACT

A method for controlling an imaging beam path which is tapped off from a film recording beam path of a movie camera and is interrupted periodically as a function of the image recording frequency of the movie camera is provided. The imaging beam path is interrupted at a constant or variable frequency by means of an optical switching element during the exposure phase of the movie film, or is deflected from a first imaging plane to at least one second imaging plane, or to a light trap. An apparatus comprising at least one DMD-chip which is arranged in the imaging beam path of the movie camera and has micromirrors which are arranged in the form of a raster, can be pivoted under electronic control, and deflect an incident beam path to a first or a second imaging plane, or into a light trap.

34 Claims, 3 Drawing Sheets

U.S. PATENT DOCUMENTS

| | | | | |
|---|---|---|---|---|
| 5,051,770 A | * | 9/1991 | Cornuejols | 396/125 |
| 5,255,030 A | * | 10/1993 | Mukai et al. | 396/20 |
| 5,552,845 A | * | 9/1996 | Nagao et al. | 396/380 |
| 5,636,001 A | * | 6/1997 | Collier | 355/41 |
| 6,308,014 B1 | | 10/2001 | Nonaka et al. | |
| 6,536,960 B2 | * | 3/2003 | Kubo et al. | 396/355 |
| 7,391,456 B2 | * | 6/2008 | Kandleinsberger et al. | 348/335 |
| 2003/0147049 A1 | * | 8/2003 | Jacumet | 352/171 |

FOREIGN PATENT DOCUMENTS

| | | |
|---|---|---|
| JP | 07306444 | 11/1995 |
| JP | 10010633 | 1/1998 |

OTHER PUBLICATIONS

International Search Report, dated Jul. 26, 2005, corresponding to PCT/DE2005/000498.

Patent Abstracts of Japan, Publication 07306444, Published Nov. 21, 1995, in the name of Aoto.

Patent Abstracts of Japan, Publication 10010633, Published Jan. 16, 1998, in the name of Kodama.

* cited by examiner

METHOD FOR CONTROLLING AN IMAGING BEAM PATH WHICH IS TAPPED OFF FROM A FILM RECORDING BEAM PATH OF A MOVIE CAMERA

CROSS-REFERENCE TO A RELATED APPLICATION

This application is a National Phase Patent Application of International Patent Application Number PCT/DE2005/000498, filed on Mar. 15, 2005, which claims priority of German Patent Application Number 10 2004 016 224.7, filed on Mar. 26, 2004.

BACKGROUND

The invention relates to a method for controlling an imaging beam path, which is tapped off from a film recording beam path of a movie camera and to an apparatus for carrying out the method.

DE 27 34 792 C2 discloses a viewfinder system for a movie camera having a rotating mirror shutter which is synchronized to the transport speed of a movie film, periodically interrupts the recording beam path, which runs from a recording objective of the movie camera to the film plane and branches off into a viewfinder beam path, such that an image of the scene to be recorded is either alternately projected onto a movie film in an exposure phase, or is diffracted from the rotating mirror shutter into the viewfinder beam path in an exposure pause. An image plane is located in the viewfinder beam path at the same distance from the reflective surface of the rotating mirror shutter as the film plane, on which image plane the viewfinder image is imaged in the exposure pause by transmission optics as a real image on the plane of an image field shutter, and can be viewed through an eyepiece.

In order to allow the contrast scope of a recorded image to be assessed better and to allow scattered light as well as reflected light to be identified more easily, it is known from pages 42 and 43 of the operating instructions for the ARRIFLEX 535 movie camera that a movie camera has to be equipped with contrast filters which can be pivoted by means of a lever into a viewfinder beam path of the movie camera, thus making it possible to vary the quality of the viewing of the recorded image in steps.

JP 10010633 A discloses a viewfinder arrangement for a still-image camera, in which a DMD (Digital Micromirror Device) chip is arranged in the viewfinder beam path and has a large number of two-dimensionally arranged micromirror elements, which comprise micromirrors which are articulated such that they can move and digitally vary the deflection angle when a voltage is applied, that is to say they can be pivoted between two different alignments of the mirror surface. The DMD chip, which is arranged in the viewfinder beam path, is driven by a DMD driver circuit and places either the recorded beams received via an objective or the information emitted from a display in the viewfinder beam path, so that it is possible to view either an object to be recorded or the display information using the viewfinder. The display and the driver circuit which drives the DMD chip are driven by a common CPU.

This known viewfinder system is, however, not suitable for overlaying format indications on the viewfinder image of a movie camera or for superimposing or simultaneous overlaying of recording-specific or camera-specific data in a viewfinder image together with the viewfinder beam path, which is tapped from a recording beam path, since the display information which is overlayed in the viewfinder beam path is input from the display, but is not governed by the position or deflection of the micromirrors.

It is also known for DMD chips to be driven with a changing frequency, so that the gray-scale levels for the light transmission by means of the DMD chip can be varied as a function of the ratio of the switched-on times to the switched-off times, that is to say a brighter gray-scale level is transmitted when the switched-on times are long in comparison to the switched-off times, while darker gray-scale levels are transmitted if the switched-off times are increased in comparison to the switched-on times.

A further problem in the operation of movie cameras is that there is a risk of the introduction of stray light via the eyepiece and the viewfinder beam path into the movie camera and thus into the recording beam path, resulting in undesirable exposure of the movie film, when, for example, the eyepiece is not covered by the cameraman's eye. In order to prevent such inadvertent exposure of the movie film by means of stray light, complex measures are required, which consume space.

SUMMARY

In one exemplary embodiment the present invention specifies a method of the type mentioned in the introduction, by means of which the contrast of the viewfinder image can be infinitely variable, and which ensures that no stray light can reach the movie film even when the viewfinder eyepiece is not covered.

An exemplary solution according to an exemplary embodiment of the invention allows continuously variable adjustment of the image brightness and/or of the image contrast of a viewfinder image, and prevents stray light from reaching the movie film in a movie camera via the viewfinder beam path, irrespective of whether the viewfinder is covered.

In particular, the exemplary solution according to an exemplary embodiment of the invention makes it possible to use the optical capabilities of an optical switching element in the form of a DMD chip in order to view the image through the viewfinder of a movie camera, in that it controls the amount of light which is deflected into the eyepiece of a movie camera from the viewfinder beam path during pauses in the exposure of the movie film, and thus allows both better assessment of the amount of contrast in the recorded image, as well as making it easy to identify stray light and light reflections. Furthermore, if the optical switching element is driven such that it is synchronized to the image recording sequence of the movie camera, this makes it possible to prevent stray light from entering the movie camera, and thus from reaching the movie film, via the viewfinder beam path.

Variation of a duty ratio of the deflection of the imaging beam path to the various imaging planes makes it possible not only to infinitely variably adjust the contrast for image viewing through the viewfinder of the movie camera, but also to tap off an additional video beam path for viewing and recording of the recorded image on a video monitor or video recorder, and to control the amount of light which is tapped off into the video beam path.

In particular, the duty ratio for the deflection of the imaging beam path is varied by pulse-width-modulated control of the optical switching element.

The imaging beam path may either be deflected as the viewfinder beam path of the movie camera onto an image plane which can be viewed through an eyepiece, or into a light trap, as a video beam path of the movie camera to an opto-electronic transducer for conversion of the video beam path to video signals, or into a light trap and both into a viewfinder beam path with an image plane, which can be viewed through an eyepiece, and into a video beam path with an optoelectronic transducer for conversion of the video beam path to video signals from the movie camera, or into a light trap.

In order to prevent exposure of the movie film by stray light when the eye has been removed from the viewfinder of the movie camera or the viewfinder is not covered, the imaging beam path is either interrupted in synchronism with the exposure phase of the movie film, or is deflected from the image plane to be viewed through the eyepiece into the light trap. In addition to the infinitely variably adjustable contrast filter, this provides an electronic closure in the viewfinder beam path of a movie camera, which effectively prevents inadvertent exposure of the movie film by light which enters the cameras interior via the viewfinder beam path.

An exemplary embodiment apparatus for carrying out the method is characterized by at least one DMD (Digital Micromirror Device) chip which is arranged in the imaging beam path of the movie camera and has a large number of micromirrors which are arranged in the form of a raster, can be pivoted under electronic control, and deflect the incident beam path to a first or a second imaging plane, or into a light trap.

The apparatus according to the invention results in an optical switching element which is in the form of a DMD chip being used as an infinitely variable contrast filter and stray-light filter. Furthermore, the DMD chip may be used as an optical switching element to prevent stray light from entering the recording beam path, and to control the amount of light which is input into a viewfinder beam path and/or into a video beam path of a movie camera.

These functions are carried out in such a way that the micromirrors of a first DMD chip reflect the imaging beam path alternately to imaging optics in a viewfinder beam path, or into a beam path of a first light trap, and/or the micromirrors of a second DMD chip deflect the imaging beam path alternately to a video beam path with an optoelectronic transducer for conversion of the video beam path to video signals, or into a beam path of a second light trap.

In one exemplary embodiment, the imaging beam path is split via a beam splitter into a viewfinder beam path and a video beam path. The micromirrors of the first DMD chip, which is arranged in the viewfinder beam path, reflect the imaging beam path to the imaging optics in the viewfinder beam path with an image plane which can be viewed through an eyepiece, or into the beam path of the first light trap, and the micromirrors of the second DMD chip deflect the imaging beam path to the video beam path with an optoelectronic transducer for conversion of the video beam path to video signals, or into the beam path of the second light trap.

Alternatively, the beam splitter can be arranged between the first DMD chip and the viewfinder eyepiece, and can split the imaging beam path into a viewfinder beam path and a video beam path, with the micromirrors of the first DMD chip for light control alternately reflecting the imaging beam path to the beam splitter or into the beam path of the first light trap.

In this embodiment variant, the micromirrors of a second DMD chip for light control can deflect the video beam path to an optoelectronic transducer for conversion of the video beam path to video signals, or into a beam path of a second light trap.

The DMD chip or chips is or are preferably driven via a driver circuit which is connected to a control circuit for the movie camera and for the video output mirror or mirrors. This not only makes it possible to control the amounts of light which are input into the viewfinder beam path or into the video beam path, but also to control the synchronization with the image recording frequency of the movie camera and/or the video frequency of the video output mirror device.

BRIEF DESCRIPTION OF THE DRAWINGS

Further features of the invention and of the advantages which can be achieved by the solution according to the invention will be explained with reference to exemplary embodiments, which are illustrated in the figures, in which.

DETAILED DESCRIPTION

Figure 1:
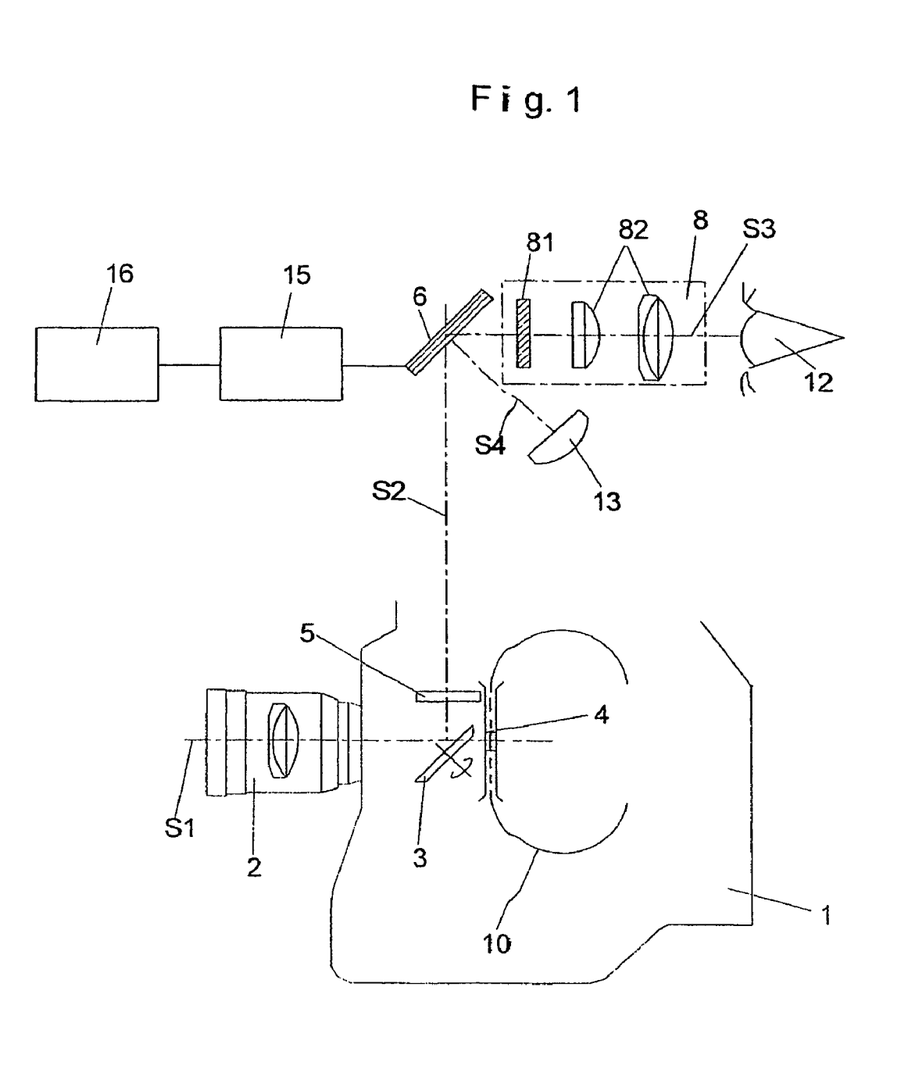
FIG. 1 shows a schematic illustration of a film recording and imaging beam path of a movie camera with a DMD chip for deflection of the imaging beam path into the viewfinder beam path of the movie camera, or into a light trap.

FIG. 1 uses schematic outlines to show a movie camera 1 with a rotating mirror shutter 3, which passes a recording beam path S1 which is passed via a camera objective 2, to a movie film 10, which moves on a film plane behind an image window 4, for film image exposure during an exposure phase, or periodically deflected into an imaging beam path S2. A fiber panel or a matt disk 5 which, for example, is in the form of a planar-convex lens, is arranged in the imaging beam path S2 and is located on the image plane, that is to say at the same distance from the rotating mirror shutter 3, as the film plane, on which the movie film 10 is transported intermittently.

The recorded image which is imaged on the matt disk or fiber panel 5 in the exposure pauses of the movie film 10 is deflected by means of a DMD chip 6 either into a viewfinder beam path S3 or into a beam path S4 which leads to a light trap 13. The DMD chip 6 has a large number of tilting micromirrors, which are arranged in the form of a raster or matrix and can be driven quickly by means of a driver circuit 15, on a semiconductor substrate, which mirrors are pivoted, depending on the drive, by the driver circuit 15 between two mirror positions, which include an angle of, for example, 10 to 12 degrees. Because the micromirrors of the DMD chip 6 are arranged in the form of a raster or matrix, each micromirror corresponds to one image pixel, so that an image code which is supplied to the DMD chip 6 from the driver circuit 15 in order to drive the micromirrors initiates each individual micromirror, and accordingly leaves it in the rest position, or deflects it to a deflected position.

On the input side, the driver circuit 15 is connected to a control circuit 16, which is connected to an input keyboard, camera or image recording sensors, or part of a microprocessor of the movie camera 1 in order to control the camera functions and processing of input data or data recorded by sensors.

The viewfinder eyepiece 8 contains an adjusting disk 81 in the form of a matt disk or fiber panel, where a viewfinder image is imaged, and can be viewed by a cameraman's eye 12 via viewfinder optics 82.

The input field of the movie camera 1 contains a nominal-value transmitter or a control element, by means of which the time duration of the deflection of the imaging beam path S2 into the viewfinder beam path level S3 during the exposure phase of the movie film 10, and thus the amount of light input into the viewfinder beam path S3, can be adjusted. This allows the cameraman to mask out stray-light influences and light reflections in the recorded image and, in particular, to optimize the contrast range in the recorded image, in which case the continuously variable adjustment of the control element is associated with continuously variable variation of a duty ratio of the micromirrors of the DMD chip 6, by means of which the micromirrors are pivoted between the viewfinder beam path S3 and the beam path S4 of the light trap 13.

The driver circuit 15 drives the DMD chip 6 in such a manner that, during the image exposure pause, the micromirrors of the DMD chip 6 are pivoted backward and forward at high frequency between the viewfinder beam path S3 and the beam path S4 of the light trap 13, and the amount of light, which is input into the viewfinder beam path S3 on the one hand and into the beam path S4 of the light trap 13 on the other hand, in the imaging beam path S2 is varied infinitely variably by variation of the duty ratio, by means of pulse-width modulation.

In order to prevent the movie film 10 from being exposed by stray light when the eye 12 has been removed from the eyepiece 8 or the viewfinder eyepiece 8 is not covered, the DMD chip 6 is driven via the driver circuit 15 by the control circuit 16 such that the viewfinder beam path S3 is interrupted synchronously during the exposure phase of the movie film 10, so that, during the exposure phase of the movie film 10, the micromirrors of the DMD chip 6 deflect the imaging beam path S2 into the beam path S4 of the light trap 13, and thus mask out the light beams entering the movie camera 1 from the viewfinder optics 8.

Figure 2:
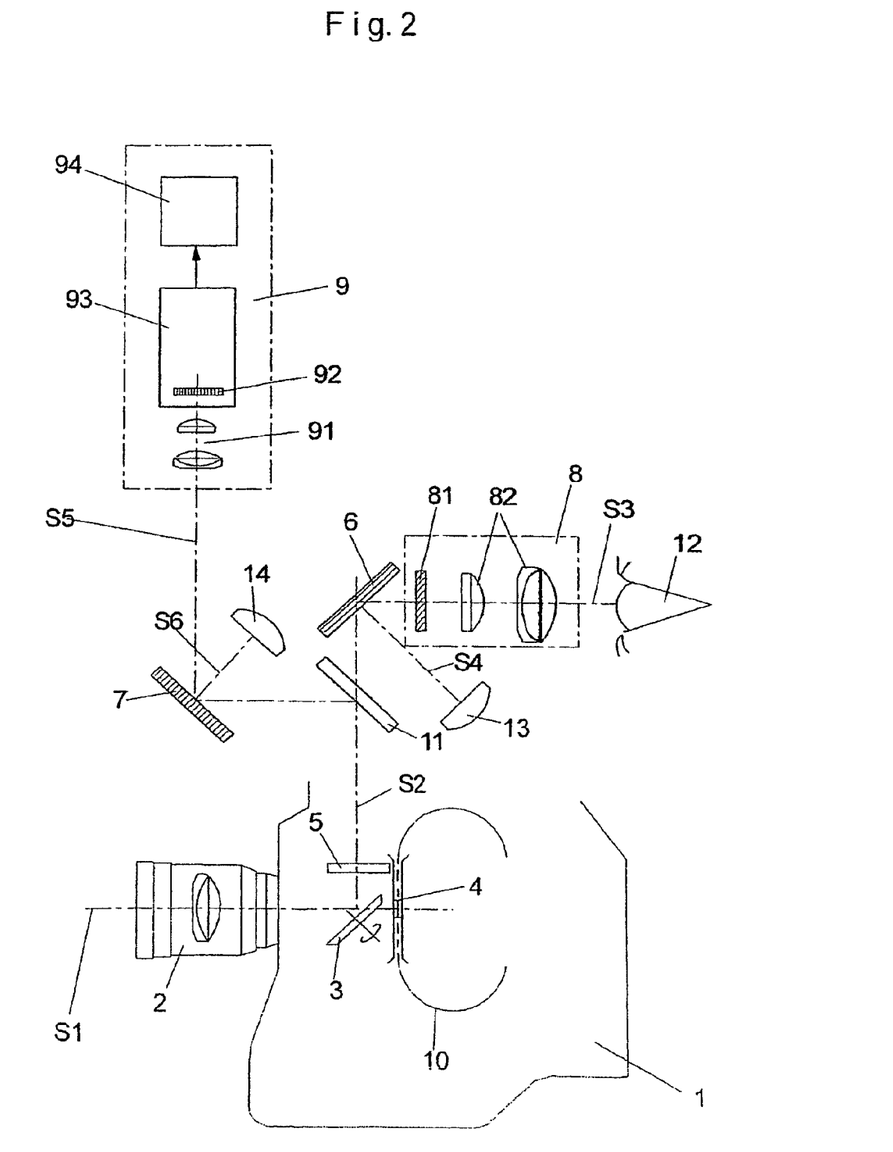
FIG. 2 shows a schematic illustration of a film recording and imaging beam path of a movie camera with a beam splitter for deflection of the imaging beam path into a viewfinder beam path, and a video beam path, each having a DMD chip for light control.

The arrangement shown in FIG. 1 may analogously have a video output mirror device 9 as shown in FIG. 2 added to it, whose object and function will be explained in more detail in the following text.

In a corresponding manner to the schematic illustration of a film recording beam path and imaging beam path shown in FIG. 1, FIG. 2 shows a movie camera 1 with a rotating mirror shutter 3, which passes on the recording beam path S1, which passes via a camera objective 2, either to a movie film 10, which moves on a film plane behind an image window 4, for film image exposure, or deflects it to an imaging beam path S2. A matt disk 5, on which a recorded image is imaged during the exposure pauses of the movie film 10, as well as a beam splitter 13 are arranged in the imaging beam path S2, with the beam splitter 13 splitting the imaging beam path S2 into a viewfinder beam path S3, and a video beam path S5.

The viewfinder beam path S3 is deflected by means of a first DMD chip 6, which is arranged in the viewfinder beam path S3, either into a viewfinder eyepiece 8 or into a beam path S4, which leads to a first light trap 13.

The first DMD chip 6 has a large number of micromirrors which can be driven at high speed and are arranged in the form of a raster or matrix, and which are pivoted between two limit positions, which include an angle of, for example, 10 to 12 degrees.

The viewfinder eyepiece 8 contains an adjusting disk 81 in the form of a matt disk or fiber panel, where a viewfinder image is imaged and can be viewed via viewfinder optics 82 by a cameraman's eye 12.

A second DMD chip 7 is arranged in the video beam path S5, which is split off from the imaging beam path S2 by beam splitter 11, and likewise has a large number of micromirrors which can be driven quickly and are arranged in the form of a raster or matrix, and are pivoted between two limit positions which include an angle of, for example, 10 to 12 degrees, and which deflects the video beam path S5 either to a video output mirror device 9 or as the beam path S6 to a second light trap 14.

The video output mirror device 9 contains video optics 91, a video sensor 92 which converts the optical image from the beam path S5 to image signals, and video electronics 93, which produce video signals from the image signals and emit them, possibly together with further control signals and data, to a personal computer, as well as receiving data and control signals from the personal computer. Since the video beam path S5 which is deflected from the imaging beam path S2 by means of the beam splitter 11 is passed via the second DMD chip 7, the recorded image is laterally inverted in the beam path to the video output mirror device 9, so that electronic mirroring is carried out in the video output mirror device 9, in order to reproduce the image correctly.

The video electronics 93 offer the capability for connection of a monitor 94, on which the video images formed from the video signals can be viewed directly on the movie camera 1.

Depending on the angular position of the rotating mirror shutter 3, the recording beam path Si strikes the opening sector (bright sector) of the rotating mirror shutter 3, and passes through the image window 4 to the movie film 10, which is guided in the film channel. During transportation of the movie film 10, the image window 4 is covered by the mirror surface of the rotating mirror shutter 3, and the recording beam path Si is deflected as the imaging beam path S2 onto the matt disk or fiber panel 5, from where the imaging beam path S2 is split via the beam splitter 11 into the viewfinder beam path S3 and the video beam path S5. The viewfinder beam path S3, which falls on the first DMD chip 6, is deflected via its micromirror either to the viewfinder eyepiece 8 or as the beam path S4 to the first light trap 13.

The video beam path S5, which is derived from the beam splitter 11, falls on the second DMD chip 7, which deflects it either to the video output mirror device 9 or as the beam path S6 to the second light trap 14. As a result of the periodic interruption in the recording beam path S1, the video output mirror device 9 has predetermined for it not only a mode select signal, which presets a desired exposure mode, but also a shutter index signal by the movie camera, which corresponds to the respective exposure conditions for the video beam path S5 and thus the exposure conditions on the video sensor 92.

Figure 3:
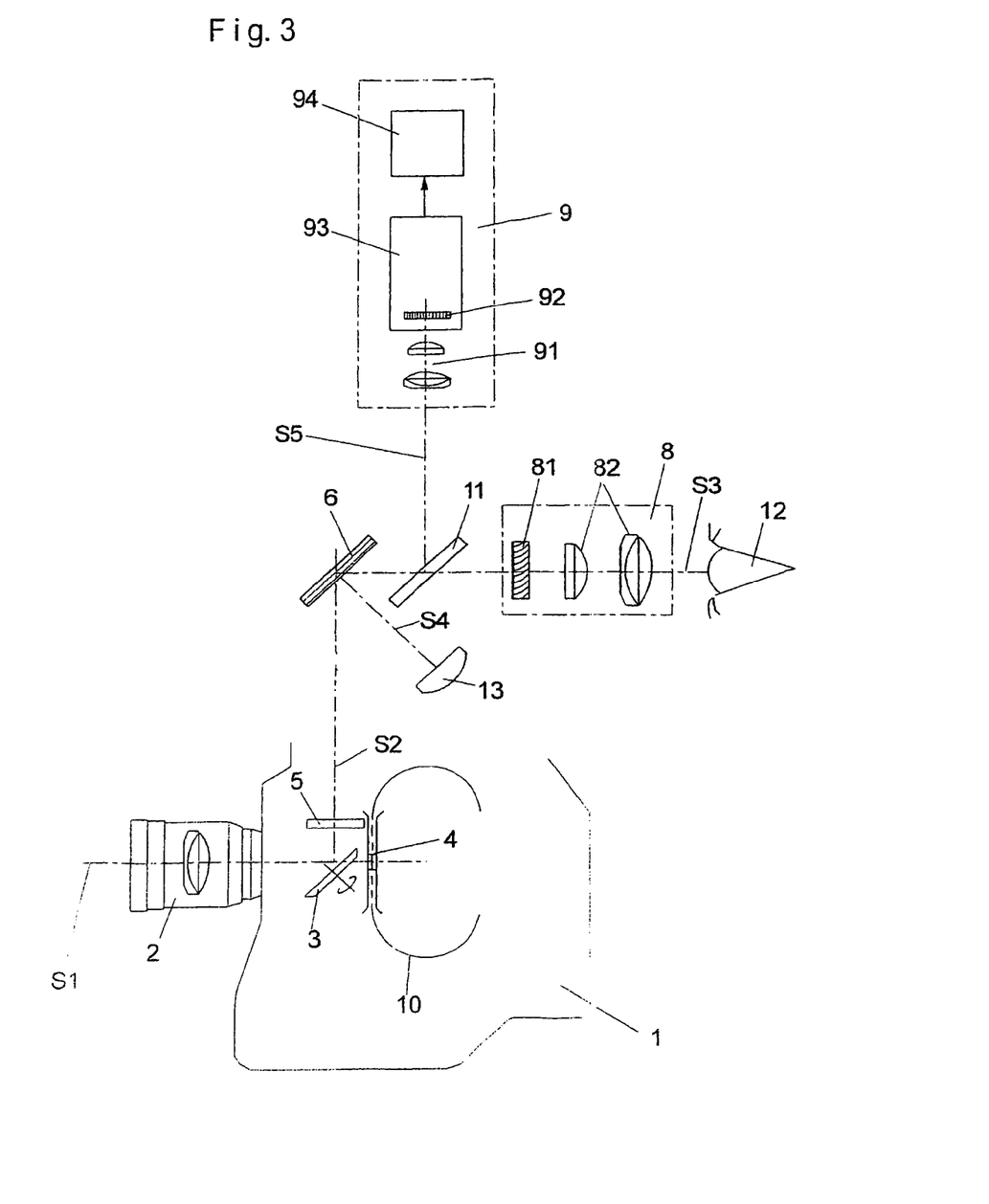
FIG. 3 shows a schematic illustration of a film recording and imaging beam path of a movie camera with a DMD chip for light control, and with a beam splitter for deflection of the imaging beam path into a viewfinder beam path and a video beam path.

FIG. 3 shows an alternative embodiment in which the beam splitter 11 is arranged between the first DMD chip 6 and the adjusting disk 81 for the viewfinder eyepiece 8, so that the imaging beam path S2 is either reflected into the combined viewfinder and video beam path S3 and S5, respectively, or to the first light trap 13. The amount of light which is deflected into the viewfinder and video beam path S3 or S5, respectively, is in this embodiment the same and depends on the division ratio of the beam splitter 11, which may also be provided with different reflection areas or pass areas, thus ensuring that the image is viewed in a suitable manner through the eyepiece 8 and video output mirror system.

In this embodiment, either the second DMD chip 7 may be omitted, so that the video beam path corresponds to the viewfinder beam path, or a second DMD chip 7 is provided in conjunction with a second light trap 14, as in the embodiment shown in FIG. 2.

The invention claimed is:

1. A method for controlling an imaging beam path, which is tapped off from a movie film recording beam path of a movie camera and is interrupted periodically as a function of an image recording frequency of the movie camera, wherein the imaging beam path is interrupted at a constant or variable frequency by means of an optical switching element during an exposure pause of the movie film, or is deflected from a first imaging plane to at least a second imaging plane, or to a light trap, wherein a duty ratio of the deflection of the imaging beam path onto the imaging planes or into the light trap is varied.

2. The method of claim 1, wherein the imaging beam path is deflected on a pulse-width-modulated basis onto the imaging planes or into the light trap.

3. The method of claim 1, wherein the imaging beam path is deflected as a viewfinder beam path of the movie camera onto an imaging plane, viewable through an eyepiece, or into the light trap.

4. The method of claim 1, wherein the imaging beam path is deflected as a video beam path of the movie camera to a video output mirror device with an optoelectronic transducer for conversion of the video beam path to video signals, or into another light trap.

5. The method of claim 1, wherein the imaging beam path is deflected via a beam splitter into a viewfinder beam path with an image plane which can be viewed through an eyepiece, and into a video beam path with an optoelectronic transducer for conversion of the video beam path to video signals from the movie camera.

6. The method of claim 1, wherein the imaging beam path is interrupted in synchronism with the exposure pause of the movie film.

7. The method of claim 1, wherein the viewfinder beam path is deflected in synchronism with an exposure phase of the movie film from the first imaging plane, which can be viewed through an eyepiece, to the first light trap.

8. The method of claim 4, wherein the video beam path is deflected in synchronism with an exposure phase of the movie film from the video output mirror device to said another light trap.

9. An apparatus including a light trap for carrying out a method for controlling an imaging beam path, which is tapped off from a film recording beam path of a movie camera and is interrupted periodically as a function of an image recording frequency of the movie camera, wherein the imaging beam path is interrupted at a constant or variable frequency by means of an optical switching element during the exposure pause of a movie film, or is deflected from to at least one of a first imaging plane, a second imaging plane and the light trap, comprising at least one DMD-chip which is arranged in the imaging beam path of the movie camera and has a plurality of micromirrors which are arranged in the form of a raster, wherein said DMD chip is pivotable under electronic control, and deflects the beam path to at least one of the first, the second imaging plane, and the light trap.

10. The apparatus of claim 9, wherein the micromirrors of a first DMD chip reflect the imaging beam path to imaging optics in a viewfinder beam path or into a beam path of the light trap.

11. The apparatus of claim 10, wherein the micromirrors of a second DMD chip reflect the imaging beam path into a video beam path with an optoelectronic transducer for compression of the video beam path to video signals, or into a beam path of another light trap.

12. The apparatus of claim 9, wherein the imaging beam path is split via a beam splitter into a viewfinder beam path and a video beam path, wherein the micromirrors of said DMD chip, which is arranged in the viewfinder beam path, reflect the imaging beam path to the imaging optics in the viewfinder beam path with an image plane which can be viewed through an eyepiece, or into the beam path of the light trap, and wherein the micromirrors of the second DMD chip deflect the imaging beam path to the video beam path by means of an optoelectronic transducer for conversion of the video beam path to video signals, or into the beam path of a second light trap.

13. The apparatus of claim 9, further comprising a beam splitter which is arranged between the DMD chip and a viewfinder eyepiece, and splits the imaging beam path into a viewfinder beam path and a video beam path, wherein the micromirrors of the DMD chip reflect the imaging beam path alternately to the beam splitter or into a beam path of the light trap.

14. The apparatus of claim 13, wherein the micromirrors of a second DMD chip deflect the video beam path to an optoelectronic transducer for conversion of the video beam path to video signals, or into a beam path of a second light trap.

15. The apparatus of claims 14, wherein at least one of said DMD chips is connected via a driver circuit to a control circuit for the movie camera.

16. A method for controlling an imaging beam path, which is tapped off from a movie film recording beam path of a movie camera and is interrupted periodically as a function of an image recording frequency of the movie camera, wherein the imaging beam path is interrupted at a constant or variable frequency by means of an optical switching element during an exposure pause of the movie film, or is deflected from a first imaging plane to at least a second imaging plane, or to a light trap, wherein the viewfinder beam path is deflected in synchronism with the exposure pause of the movie film from the first imaging plane, which can be viewed through an eyepiece, to the first light trap.

17. A method for controlling an imaging beam path, which is tapped off from a movie film recording beam path of a movie camera and is interrupted periodically as a function of an image recording frequency of the movie camera, wherein the imaging beam path is interrupted at a constant or variable frequency by means of an optical switching element during an exposure pause of the movie film, or is deflected from a first imaging plane to at least a second imaging plane, or to a light trap, wherein the imaging beam path is deflected as a video beam path of the movie camera to a video output mirror device with an optoelectronic transducer for conversion of the video beam path to video signals, or into another light trap, and wherein the video beam path is deflected in synchronism with the exposure phase of the movie film from the video output mirror device to said another light trap.

18. An apparatus for carrying out a method for controlling an imaging beam path, which is tapped off from a film recording beam path of a movie camera and is interrupted periodically as a function of an image recording frequency of the movie camera, wherein the imaging beam path is interrupted at a constant or variable frequency by means of an optical switching element during the exposure pause of a movie film, or is deflected from a first imaging plane to a second imaging plane, or to a light trap, comprising at least one DMD-chip which is arranged in the imaging beam path of the movie camera and has a plurality of micromirrors which are arranged in the form of a raster, wherein said DMD chip is pivotable under electronic control, and deflects the beam path to the first or the second imaging plane, or into a light trap, wherein the micromirrors of a first DMD chip reflect the imaging beam path to imaging optics in a viewfinder beam path or into a beam path of the light trap, and wherein the micromirrors of a second DMD chip reflect the imaging beam path into a video beam path with an optoelectronic transducer for compression of the video beam path to video signals, or into a beam path of another light trap.

19. The apparatus of claim 18, wherein the imaging beam path is split via a beam splitter into a viewfinder beam path and a video beam path, wherein the micromirrors of said DMD chip, which is arranged in the viewfinder beam path, reflect the imaging beam path to the imaging optics in the viewfinder beam path with an image plane which can be viewed through an eyepiece, or into the beam path of the light trap, and wherein the micromirrors of the second DMD chip deflect the imaging beam path to the video beam path by means of an optoelectronic transducer for conversion of the video beam path to video signals, or into the beam path of a second light trap.

20. An apparatus for carrying out a method for controlling an imaging beam path, which is tapped off from a film recording beam path of a movie camera and is interrupted periodically as a function of an image recording frequency of the movie camera, wherein the imaging beam path is interrupted at a constant or variable frequency by means of an optical switching element during an exposure pause of a movie film, or is deflected from to at least one of a first imaging plane, a second imaging plane and a light trap, comprising at least one DMD-chip which is arranged in the imaging beam path of the movie camera and has a plurality of micromirrors which are arranged in the form of a raster, wherein said DMD chip is pivotable under electronic control, and deflects the beam path to at least one of the first, the second imaging plane, the light trap, wherein the apparatus further comprises a beam splitter which is arranged between the DMD chip and a viewfinder eyepiece, and splits the imaging beam path into a viewfinder beam path and a video beam path, wherein the micromirrors of the DMD chip reflect the imaging beam path alternately to the beam splitter or into a beam path of the light trap, wherein the micromirrors of a second DMD chip deflect the video beam path to an optoelectronic transducer for conversion of the video beam path to video signals, or into a beam path of a second light trap.

21. The apparatus of claims 20, wherein at least one of said DMD chips is connected via a driver circuit to a control circuit for the movie camera.

22. A method for controlling an imaging beam path, which is tapped off from a movie film recording beam path of a movie camera which includes a light trap and is interrupted periodically as a function of an image recording frequency of the movie camera, wherein the imaging beam path is interrupted at a constant or variable frequency by means of an optical switching element during an exposure pause of the movie film, and wherein the imaging beam path is deflected as a viewfinder beam path of the movie camera either onto an imaging plane, viewable through an eyepiece, or into a light trap.

23. The method of claim 22, wherein the viewfinder beam path is deflected in synchronism with an exposure phase of the movie film from the first imaging plane, which can be viewed through an eyepiece, to the first light trap.

24. A method for controlling an imaging beam path, which is tapped off from a movie film recording beam path of a movie camera which includes a light trap and is interrupted periodically as a function of an image recording frequency of the movie camera, wherein the imaging beam path is interrupted at a constant or variable frequency by means of an optical switching element during an exposure pause of the movie film, and wherein the imaging beam path is deflected as a video beam path of the movie camera to a video output mirror device with an optoelectronic transducer for conversion of the video beam path to video signals, or into a another light trap.

25. The method of claim 24, wherein the video beam path is deflected in synchronism with an exposure phase of the movie film from the video output mirror device to said another light trap.

26. A method for controlling an imaging beam path, which is tapped off from a movie film recording beam path of a movie camera which includes a light trap and is interrupted periodically as a function of an image recording frequency of the movie camera, said imaging beam path being deflected via a beam splitter into a viewfinder beam path and into a video beam path, said viewfinder beam path being deflected by means of a first optical switching element during an exposure pause of the movie film either to an imaging plane which can be viewed through an eyepiece, or into a light trap, and said video beam path being deflected by means of a second optical switching element during said exposure pause of the movie film either to a video output mirror device with an optoelectronic transducer for conversion of the video beam path to video signals, or into a another light trap.

27. A method for controlling an imaging beam path, which is tapped off from a movie film recording beam path of a movie camera which includes a light trap and is interrupted periodically as a function of an image recording frequency of the movie camera, wherein said imaging beam path is deflected by means of an optical switching element during an exposure pause of the movie film either as a viewfinder beam path of the movie camera onto an imaging plane, viewable through an eyepiece and into a video beam path of the movie camera to a video output mirror device with an optoelectronic transducer for conversion of the video beam path to video signals or into a light trap.

28. An apparatus for controlling an imaging beam path, which is tapped off from a movie film recording beam path of a movie camera which includes a light trap and is interrupted periodically as a function of an image recording frequency of the movie camera, wherein the imaging beam path is interrupted at a constant or variable frequency by means of an optical switching element during an exposure pause of the movie film, or is deflected from a first imaging plane to both at least a second imaging plane, or to a light trap, comprising at least one DMD-chip which is arranged in the imaging beam path of the movie camera and has a plurality of micromirrors which are arranged in the form of a raster, wherein said DMD chip is pivotable under electronic control, and deflects the beam path to said first imaging plane or both to said second imaging plane, or into said light trap.

29. The apparatus of claim 28, wherein the micromirrors of a first DMD chip reflect the imaging beam path to imaging optics in a viewfinder beam path or into a beam path of the light trap.

30. The apparatus of claim 29, wherein the micromirrors of a second DMD chip reflect the imaging beam path into a video beam path with an optoelectronic transducer for compression of the video beam path to video signals, or into a beam path of another light trap.

31. The apparatus of claim 30, wherein the imaging beam path is split via a beam splitter into a viewfinder beam path and a video beam path, wherein the micromirrors of said first DMD chip, which is arranged in the viewfinder beam path, reflect the imaging beam path to the imaging optics in the viewfinder beam path with an image plane which can be viewed through an eyepiece, or into the beam path of the light trap, and wherein the micromirrors of the second DMD chip deflect the imaging beam path to the video beam path by means of an optoelectronic transducer for conversion of the video beam path to video signals, or into the beam path of the second light trap.

32. The apparatus of claim 28, further comprising a beam splitter which is arranged between the DMD chip and a viewfinder eyepiece, and splits the imaging beam path into a viewfinder beam path and a video beam path, wherein the micromirrors of the DMD chip reflect the imaging beam path alternately to the beam splitter or into a beam path of the light trap.

33. The apparatus of claim 32, wherein the micromirrors of a second DMD chip deflect the video beam path to an optoelectronic transducer for conversion of the video beam path to video signals, or into a beam path of a second light trap.

34. The apparatus of claims 33, wherein at least one of said DMD chips is connected via a driver circuit to a control circuit for the movie camera.

* * * * *